United States Patent [19]

Przybyla et al.

[11] 4,066,822
[45] Jan. 3, 1978

[54] SELF SEALING MICROPOROUS MEMBRANE FOR ELECTROCHEMICAL CELLS AND METHOD OF FORMING SAME

[75] Inventors: Franciszek J. Przybyla; Michael J. Smith, both of Mississauga, Canada

[73] Assignee: P. R. Mallory & Co. Inc., Indianapolis, Ind.

[21] Appl. No.: 727,546

[22] Filed: Sept. 28, 1976

[51] Int. Cl.² .............................................. H01M 8/02
[52] U.S. Cl. .................................................... 429/27
[58] Field of Search ........................... 429/27, 34–36, 429/174, 86

[56] References Cited

U.S. PATENT DOCUMENTS

| 3,746,580 | 7/1973 | Aker et al. | 429/27 |
| 3,897,265 | 7/1975 | Jaggard | 429/35 |

*Primary Examiner*—John H. Mack
*Assistant Examiner*—H. A. Feeley
*Attorney, Agent, or Firm*—Ronald S. Cornell; Israel Nissenbaum; Charles W. Hoffmann

[57] ABSTRACT

A self sealing microporous membrane of utility especially in electrochemical cells of the gas-depolarized type comprising a microporous polymer membrane of a density range between about 0.7 and 1.9 grams per centimeter embodies a pressurized sealing zone of maximum density and zero porosity. Such pressurized zone is located to provide a seal against leakage of electrolyte.

6 Claims, 3 Drawing Figures

SELF SEALING MICROPOROUS MEMBRANE FOR ELECTROCHEMICAL CELLS AND METHOD OF FORMING SAME

BACKGROUND OF THE INVENTION

This invention relates generally to a self sealing microporous membrane for electrochemical cells and more particularly to cells of the gas-depolarized type.

The properties inherent in the sealing of gas-depolarized galvanic cells is well established in the art and has been described in a number of patents. Injection molding of the gas-depolarized cathode provides a useful solution, but decreases the usable volume of the cell, increases cost and leads to difficulties in assembly. Attempts at using a single insulating and sealing member while increasing the usable volume of the cell have demonstrated a statistically high rate of failure in the seal due partially to the ineffective sealing of one surface of the sealing member at the region of the seal as may occur in Jaggard U.S. Pat. No. 3,897,265.

SUMMARY OF THE INVENTION

The present invention overcomes these statistical failures by utilizing two metal parts in combination with a microporous polymer membrane to provide a seal for the membrane as well as for electrolyte in a cell containing said membrane. This assures a virtually leak-proof seal and a much simplified method of cell manufacture. Furthermore, the seal of the present invention is accomplished prior to the addition of electrolyte and cell closure and is independent of other cell components.

DETAILED DESCRIPTION OF THE INVENTION

Figures 1, 2, 3:
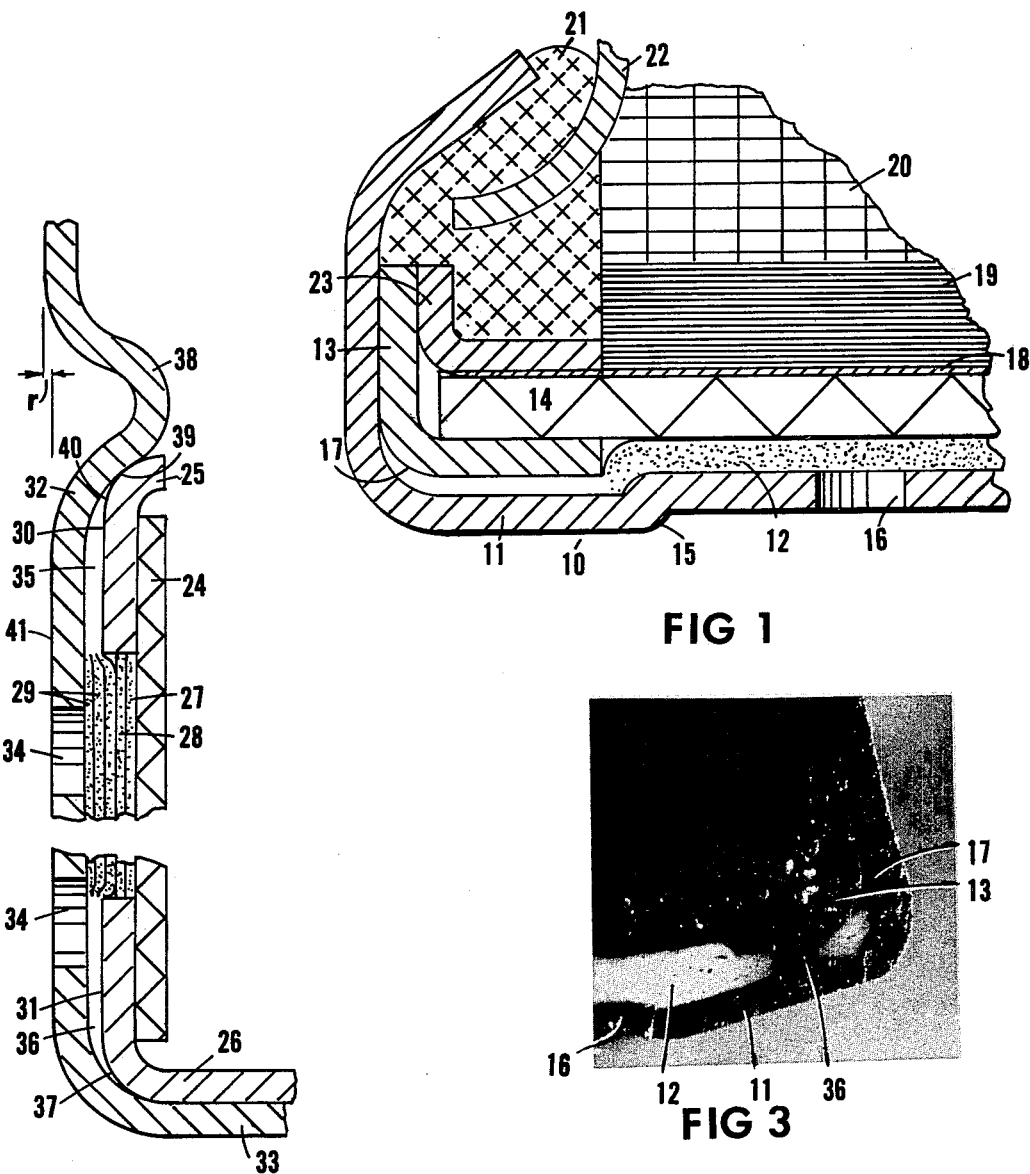
FIG. 1 is a sectional view of a portion of a button electrochemical cell of the gas-depolarized type and embodying the membrane of the invention.
FIG. 2 illustrates in partial vertical section the application of the membrane of the invention to a cylindrical configuration of electrochemical cell of the gas-depolarized type.
FIG. 3 is a 20× lithographic reproduction of a black and white photograph of a seal provided in a cell of the general form shown in FIG. 1 and revealing the photographic appearance of high density and low density portions of the membrane of the invention.

The preferred porous membrane of the invention comprises polytetrafluoroethylene of lesser rather than greater density, i.e. in the lower end of the range between 0.5 and 1.9 gm/cm$^3$. While such material is available in thicknesses between about 3 mils and about 12 mils or more, it is convenient and even an advantage in some circumstances of the invention to use the thinner material especially in cylindrical rather than flat or button type cell configurations.

DESCRIPTION OF THE PREFERRED EMBODIMENT

The porous barrier membrane of the invention embodies in one utility, a cathode assembly of a novel design, the remaining parts of the cell being identical to prior art components.

With reference to FIG. 1, the cathode assembly 10 consists of a self-supporting positive terminal consolidation of a cathode container 11, a microporous polymer membrane 12 and a metal ring 13, together with a separate self-supporting gas-depolarized electrode 14. The cathode container 11 has a recessed bottom 15 to elevate the microporous polymer membrane 12 and hold it in permanent contact with the gas-depolarized electrode 14. The recessed part of the bottom 15 of the cathode container 11 has at least one opening 16 which allows admittance of ambient gases to the gas-depolarized electrode 14 via the microporous polymer membrane 12. The outer diameter of the metal ring 13 is larger than the inner diameter of the cathode container 11 by a pre-designed value, depending on the size of the cathode container, to form an interference fit, and the leading edge 17 of the metal ring 13 has a curvature to allow entry into the cathode container 11. Reliable and uniform results derive from an adequate interference fit for cells of various diameter by designing the minimum size of the outer diameter of the metal ring 13 larger in size than the inner diameter of the mating cathode container 11 by the tolerance or permissible variation of ring diameter. During formation of the interference fit, the cathode container 11, a microporous polymer membrane 12 and a metal ring 13 form a self-supporting consolidation. That portion of the microporous polymer membrane 12 which is between the cathode container 11 and metal ring 13 is compressed to substantially reduce its porosity and cause cold flow of the polymer material to fill all parts of the gap between the cathode container 11 and a metal ring 13, so that a seal is formed in situ which is leakproof to electrolytes. A gas-depolarized electrode disc 14 is droped into the self-supporting consolidation, and from this point on the cell is built and assembled identically to other cells known in the art; an ion permeable barrier 18, an electrolyte absorber 19, an anode material 20, electrolyte; an insulating gasket 21; and an anode container 22 are added and the cell is then closed by crimping the upper edge of the cathode container 11 onto the gasket 21. In the closed cell, the gasket 21 maintains contact of the gas-depolarized electrode 14 to the horizontal section of the metal ring 13 which is in interference fit contact with the cathode container 11; thus, the metal ring 13 serves the dual role of maintaining a leakproof seal and providing electrical contat to the gas-depolarized electrode 14.

Reinforcement of the contact between metal ring 13 and gas-depolarized electrode 14 by welding can be added, but it is not required for most applications. Electrical contact between gas-depolarized electrode 14 and metal ring 13 can be accomplished without employing the insulating gasket 21 by welding or by utilizing a second metal ring 23 to form a press fit with the first metal ring, or cathode container.

The gas-depolarized electrode 14 comprises a current collecting member, which can be a metal screen or perforated or porous metal, and a cathode material, which consists typicaly of porous carbon powder, graphite powder, a minor quantity of conventional catalyst distributed throughout the carbonaceous powder, and a minor amount of a polymer binder, as known in the art. The polymer bindr is preferably fluoroethylene-propylene, but other fluorocarbon and non-fluorocarbon binders are also effective.

The recessed bottom 15 of cathode container 11 was found to improve uniformity of discharge characteristic; however, good discharge characteristics were also obtained without the recessed bottom 15.

The cathode container 11 is formed from nickel plated steel, but other corrosion resistant platings can be used. The negative metal container 22 is formed from nickel plated steel, and the inside is coated with a thin metal layer which is compatible with the anode material and electrolyte, as known in the art.

The insulating gasket 21 is molded from a polymeric resin or elastomeric material, as a separate member, or as a consolidated unit with the negative metal container 22 by insert molding, as known in the art.

The cell of this invention is not limited to one single anode material or electrolyte. As known in the art, cadmium, lead, tin, amalgamated zinc, or other metals can be used, together with compatible electrolytes. Frequently, gelling agents and inhibitors are added to anode material or electrolyte.

An L-shaped cross section is preferred for the metal ring 13 because it occupies least space while accomplishing the interference fit necessary to simultaneously form a seal in situ and provide electrical contact with the cathode container 11. This being the preferred shape of the metal ring, should not exclude other shapes, such as a rectangular cross-section, U-shaped or crescent-shaped cross sections, and similar forms.

EXAMPLE

As in FIG. 1 a cathode can of inner diameter 0.434 inches and height 0.118 inches is drawn, and, as the last step of the drawing operation, a recess 0.008 inches deep and of diameter 0.335 inches is formed in the centre of the bottom and four 0.027 inch diameter holes are formed in the recessed portion of the bottom. A microporous PTFE disc 0.012 inches thick and of diameter 0.434 inches is dropped into the cathode can. The assembly is placed into a die and nickel plated steel ring having an L-shaped cross-section, and outer diameter 0.438 inch a central aperture of 0.373 inch, and a radius at the bend of 0.015 inch is located, with the smaller opening downwards, at the cathode can entrance, and then pushed downward by means of a punch and press until the gap between ring and bottom of cathode can is 0.008 inches and filled with densified PTFE. The self-supporting cathode consolidation is ejected from the die, and the inside diameter of the can is determined as 0.438 inches. An oxygen diffusion electrode of a diameter of 0.374 inches is dropped into the cathode can, followed by a microporous polypropylene barrier. An anode can of outer diameter 0.334 inches and height 0.153 inches, from nickel plated steel sheet, tin coated on one side, is formed in such a way that the tin coat is on the inside surface. A nylon gasket, coated with sealant, is fitted onto the anode can. 0.5 gram of a zinc powder containing 6 to 7% of mercury is poured into the anode can. A cellulose absorber is placed onto the zinc electrode, and then 0.125 cm$^3$ of a 31% potassium hydroxide electrolyte containing 2% dissolved zinc oxide are added. The anode can is now placed onto the cathode can. The assembly is placed into a crimping die, and the cell is crimped. The cell, when discharged through a resistance of 625 ohms, delivers 200 hours of service. A batch of 100 cells is heated to 40° C in 4 hours, then cooled to −40° C in 8 hours, followed by heating to room temperature in 2 hours. This temperature cycle is repeated twice. Examination under a microscope showed no sign of leakage at the openings in the cathode can.

The membrane of the invention also finds direct application in a cylindrical configuration of electrochemical cells as indicated in FIG. 2. In this construction, the gas-depolarized electrode 24 similar to electrode 14 in its composition is rolled into a tubular configuration within outer end metal rings 25-26 which are perferably welded thereto. In this instance, it is desirable to utilize a thin membrane material of the invention and to fill part of the space between the rings 25-26 with overlapping layers of membrane material 27-28. Then a full width strip or sheet of membrane material is wrapped externally over the outer surfaces 30 and 31 of rings 25-26 respectively. Such assembly is then inserted into the apertured cylindrical can 32 having a closed end 33 with external aperture or holes 34. The assembly is then pressed into a die to reduce the effective outside diameter thereof by the radius increment "r" to effect compression of the membrane zones 35-36 to maximum density effecting extrusion as at 37. In the region of the ring 25 the outer case or can 32 is preferably swaged inwardly such as by rollers to form the circular arcuate crimp 38 coming into engagement with ring 25 at 39 thereby to form a pinch seal with the maximum density membrane material 35 as at 40.

It is to be noted especially in reference to the drawings in this application that the membrane material at less than maximum density is represented by an area covered by a substantial number of dots whereas the maximum density zone or region of the membrane exhibits no dots, or is clear. The dots in the area are intended to represent an appearance of opacity whereas the absence of dots is intended to indicate translucence or transparence for the reason that a physical phenomenon is evident when one compresses an opaque porous membrane of the invention, it becomes less opaque until at maximum density and effectively zero porosity it becomes somewhat transparent and clearly distinguishable from the zone of the membrane material at lesser pressure. Generally, the change in capacity will occur when the compression is sufficient to result in a reduction in thickness of between 25 and 45 percent. Thus the sealing ability of the membrane of the invention is exemplified by a porous relatively opaque (almost white) as contrasted with a maximum density of substantially clear obviously translucent zone in the region of the seal and it is this characteristic of the membrane of the invention which is deemed also of the invention in the field of sealable porous membranes.

More specifically in the construction of FIG. 2 the gas-depolarized electrodes 24 similar to electrode 14 from FIG. 1 in its composition is rolled into a tube of cylindrical configuration and preferably welded along the overlapping seam, but this is not required for all applications. The rolled assembly 24 is placed within outer supporting end metal rings 25-26, which are preferably resistance welded thereto. In this instance, it is desirable to utilize this microporous membrane material of the invention and to fill the space between the support rings 25-26 with two or more overlapping layers of membrane material 27-28. This is followed by a full width strip or sheet of membrane material wrapped in two or more additional layers over the outer surfaces 30 and 31 of rings 25-26 respectively. The assembly is then inserted into the cylindrical can 32 having a closed end 33 with external apertures or holes 34 in the side wall 41. The assembly is then pressed into a die to size or reduce the effective outside diameter by the radius increment r to effect compression of the membrane zones 35-36 to maximum density effecting extrusion at 27. A solid core rod of diameter equal to that of the internal diameter of the rolled cylindrical gas-depolarized electrode 24 is inserted during the sizing operation to prevent deformation of the rolled electrode 24 or support rings 25–26.

The reduction of the can 32 outer diameter by increment "r" also ensures sufficient contact pressure between the microporous membrane layers 27–28–29 and the outer surface of the rolled electrode 24 which allows diffusion of oxygen to the active surface and prevents any layer of liquid electrolyte from forming between these two members limiting the access of oxygen to the active surface of the gas-depolarized electrode.

It was found that it was possible to remove the first layers of wrapped microporous membrane 27–28 and to radially force in the side wall of the can 32 between rings 25–26 only, in addition to the diameter reducing stage, to again ensure pressure contact between the membrane layers 29 and the outer surface of the rolled electrode 24.

An alternate method of compressing the membrane in zones 35–36 to maximum density is to swage the outer case or can inwardly such as by rollers to form one or more circular crimps (such as 38) reducing the can 32 outer diameter. When two or more of the circular crimps or beads (such as 38) are used in one area 35 this effectively entraps the maximum density membrane preventing cold flow over long periods of storage.

Assembly from this point on is conventional for cylindrical cells.

What is claimed is:

1. A gas-depolarized galvanic cell comprising an anode, a gas-depolarizable cathode, at least one electrolyte carrying separator disposed therebetween, and a container having a first terminal electrically associated with said anode and a second terminal electrically associated with said cathode, said terminals being electrically insulated one from the other; at least one opening in said second terminal portion of said container, a membrane of a hydrophobic microporous material interposed between said at least one opening and, said gas-depolarizable cathode, said gas-depolarizable cathode being in gas communication with said at least one opening which is positioned to permit gas to pass therethrough from the exterior environment to and through said membrane of hydrophobic microporous material; and a metal ring disposed in said container, a portion of said ring being positioned between said membrane and said gas-depolarizable electrode and said ring being in electrical contact with said container, said ring being retained by interference fit in said container, and a portion of said membrane positioned between said ring and said container compressed to substantially zero porosity.

2. The cell of claim 1 wherein said cell is a substantially flat, button-type cell having a cup-like cathode container, said at least one opening is in the bottom of said cup, said metal ring is disposed near the bottom thereof, and said membrane is in the form of a disc secured at its periphery in the bottom of said cathode container by said metal ring.

3. The cell of claim 1 where said cell has a generally cylindrical configuration; said gas-depolarizable electrode has a generally cylindrical outer configuration and is disposed within a cylindrical cathode container for said cell and in electrical contact with a pair of metal rings, one at each end of said gas-depolarizable electrode; and said membrane is disposed in the form of a tube between said gas-depolarizable electrode and said pair of metal rings on one side and said cylindrical cathode container on the other.

4. The cell of claim 3 wherein each of said pair of metal rings has a portion disposed between said membrane and said gas-depolarizable electrode.

5. The cell of claim 4 wherein the cathode container is swaged to effect a press-fit with at least one of said rings.

6. The cell of claim 3 wherein said at least one opening is positioned in the cylindrical wall of said cylindrical cathode container.

* * * * *